(12) United States Patent  (10) Patent No.: US 7,775,044 B2
Julien et al.  (45) Date of Patent: Aug. 17, 2010

(54) LOW VOLUMETRIC COMPRESSION RATIO INTEGRATED TURBO-COMPOUND ROTARY ENGINE

(75) Inventors: André Julien, Ste-Julie (CA); André Chèvrefils, Chateauguay (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 154 days.

(21) Appl. No.: 11/208,648

(22) Filed: Aug. 23, 2005

(65) Prior Publication Data

US 2007/0240415 A1  Oct. 18, 2007

Related U.S. Application Data

(63) Continuation of application No. PCT/CA2004/000258, filed on Feb. 24, 2004.

(30) Foreign Application Priority Data

Feb. 24, 2003  (CA) .................................. 2419690

(51) Int. Cl.
*F02G 3/00* (2006.01)
(52) U.S. Cl. .......................................... 60/614; 60/624
(58) Field of Classification Search .................. 60/614,
60/624, 605.1, 612, 598, 599, 728, 225; 123/559.1,
123/289, 243
See application file for complete search history.

(56) References Cited

U.S. PATENT DOCUMENTS

| | | | |
|---|---|---|---|
| 2,578,028 A * | 12/1951 | Udale | 60/624 |
| 2,625,006 A * | 1/1953 | Lundquist | 60/624 |
| 2,755,618 A * | 7/1956 | Peterson | 123/562 |
| 3,228,183 A | 1/1966 | Feller | 60/605.1 |
| 3,672,160 A * | 6/1972 | Kim | 60/604 |
| 3,727,399 A | 4/1973 | Brille et al. | 60/599 |
| 3,818,696 A * | 6/1974 | Beaufrere | 60/39.512 |
| 3,996,747 A * | 12/1976 | Melchior | 60/614 |
| 4,037,412 A | 7/1977 | Jones | 60/605.1 |
| 4,233,815 A * | 11/1980 | Melchior | 60/606 |
| 4,241,713 A * | 12/1980 | Crutchfield | 123/243 |
| 4,291,535 A | 9/1981 | Goloff | 60/602 |
| 4,426,842 A * | 1/1984 | Collet | 60/39.511 |
| 4,766,729 A | 8/1988 | Miyajima | 60/598 |
| 4,815,282 A | 3/1989 | Wilkinson et al. | 60/605.1 |
| 5,033,269 A * | 7/1991 | Smith | 60/624 |
| 5,056,315 A | 10/1991 | Jenkins | 60/614 |
| 5,076,229 A * | 12/1991 | Stanley | 123/289 |
| 5,138,840 A * | 8/1992 | Oguchi et al. | 60/624 |
| 5,471,834 A | 12/1995 | Kapich | 60/612 |

(Continued)

FOREIGN PATENT DOCUMENTS

GB  934403  8/1963

(Continued)

*Primary Examiner*—Thai Ba Trieu
(74) *Attorney, Agent, or Firm*—Ogilvy Renault LLP

(57) ABSTRACT

A compound cycle engine (10) comprises a compressor and a turbine section (14, 18), and at least one cycle topping device (16) providing an energy input to the turbine section (18). The compressor section (14) compresses the air according to a pressure ratio $PR_{gt}$. The cycle topping device (16) further compresses the air according to a volumetric compression ratio $R_{vc}$, and wherein $PR_{gt} \times R_{vc}$ are selected, according to one aspect of the invention, to provide a cycle which permit a more compact and lighter compound cycle engine to be provided.

34 Claims, 6 Drawing Sheets

U.S. PATENT DOCUMENTS

| | | | | |
|---|---|---|---|---|
| 5,522,356 | A | 6/1996 | Palmer | 123/236 |
| 5,524,586 | A | 6/1996 | Mallen | 123/219 |
| 5,524,587 | A | 6/1996 | Mallen et al. | |
| 5,692,372 | A | 12/1997 | Whurr | 60/598 |
| 5,970,924 | A * | 10/1999 | Pyon | 60/624 |
| 6,430,931 | B1 | 8/2002 | Horner | 60/728 |
| 6,477,829 | B1 | 11/2002 | Hunter et al. | 60/225 |
| 6,488,469 | B1 * | 12/2002 | Youssef et al. | 415/143 |
| 6,526,935 | B2 * | 3/2003 | Shaw | 123/197.4 |
| 6,951,211 | B2 * | 10/2005 | Bryant | 123/559.1 |

FOREIGN PATENT DOCUMENTS

| | | | |
|---|---|---|---|
| JP | 62013722 A * | 1/1987 | 60/624 |
| WO | WO 03/076779 A1 | 9/2003 | |

* cited by examiner

LOW VOLUMETRIC COMPRESSION RATIO INTEGRATED TURBO-COMPOUND ROTARY ENGINE

RELATED APPLICATIONS(S)

This application is a continuation of International Patent Application No. PCT/CA2004/000258 filed on Feb. 24, 2004, which claims benefit of Canadian Patent Application No. 2,419,690 filed on Feb. 24, 2003, both of which are herein incorporated by reference.

FIELD OF THE INVENTION

The present invention relates to gas turbine and rotary engines and, in particular, to turbo-compounded rotary engines or turbo-compounded internal combustion engine.

BACKGROUND OF THE INVENTION

Topping of the gas turbine engine cycle is well-known in the art. U.S. Pat. Nos. 4,815,282, 5,471,834 and 5,692,372, for example, show the prior attempts at integrating gas turbine with cycle-topping devices, such as piston-type internal combustion engines and eccentric rotary engines such as the so-called Wankel engine. Such cycle topping devices promise much-improved fuel efficiency for the integrated engine. All of the integrated engines disclosed in the above mentioned patents require an intercooler to cool the air before it enters the compressor section of the engine. Such intercooler are know to be bulky, heavy, etc. and, thus, not ideal for airborne applications.

For gas turbines destined for airborne applications, integration must not only successfully address improvements in cycle efficiency, but also provide a compact and lightweight package, and preferably one which does not significantly alter the envelope required versus that of a regular (i.e. non-compounded) gas turbine engine. Prior art attempts have not been as successful in these areas, and hence there exists a need for improved compact devices which offer not only improved efficiency, but also better power density, reliability, operability and so on.

Various types of cycle topping devices are known, including both non-rotating and rotating types. The present application is particularly concerned with eccentric rotary machines of all types useful in providing cycle-topping benefits to a gas turbine engine. Examples are shown in U.S. Pat. Nos. 5,471,834, 5,522,356, 5,524,587 and 5,692,372, to name a few, though there are certainly others available as well, as will be well-understood by the skilled reader.

SUMMARY OF THE INVENTION

It is an aim of the present invention to provide a compound cycle engine better suited for airborne applications than the prior art.

One general aspect of the present invention covers an integrated cycle topping device and gas turbine engine (the "integrated engine") designed for low volumetric compression ratio (<3.5) which allows pre-mixed fuel upstream of the cycle topping device without the need of an inter-cooler. It provides for improved thermal efficiency and improved specific power.

In accordance with a further general aspect of the present invention, there is provided a compound cycle engine comprising a compressor and a turbine section, and at least one rotary engine providing an energy input to said turbine section, wherein said at least one rotary engine is mechanically linked to said turbine section to provide a common power output.

In accordance with another general aspect of the present invention, there is provided a compound cycle engine comprising a compressor section, a rotary engine section and a turbine section in serial flow communication with one another, and a primary output shaft providing the primary power output of the engine, wherein the rotary engine section and the turbine section are both drivingly connected to the primary output shaft.

In accordance with another general aspect of the present invention, there is provided a method of providing a non-intercooled cycle for a compound cycle engine, the engine having a rotary engine and a gas turbine connected in series, the method comprising the steps of: a) compressing air in a compressor section of the gas turbine, b) further compressing the air in the rotary engine, wherein the volumetric compression ratio in the rotary engine is below 3.5, c) mixing fuel with the compressed air to obtain an air/fuel mixture, d) combusting the air/fuel mixture, e) extracting energy from the combusted air/fuel mixture through expansion in the rotary engine, and f) further extracting energy from the combusted air/fuel mixture using a turbine section of the gas turbine.

In accordance with another general aspect of the present invention, there is provided a compound cycle engine comprising a compressor and a turbine section, and at least one cycle topping device providing an energy input to said turbine section, said compressor section compressing the air according to a pressure ratio $PR_{gt}$, said at least one cycle topping device further compressing the air according to a volumetric compression ratio $R_{vc}$, and wherein $PR_{gt} \times R_{vc}^{1.3} < 30$.

In accordance with a sill further general aspect of the present invention, there is provided a method of providing a non-intercooled cycle for a compound cycle engine, the engine including a cycle topping device and a gas turbine connected in series, the method comprising the steps of: a) compressing air in a compressor section of the gas turbine using a pressure ratio $PR_{gt}$, b) further compressing the air in the cycle topping device using a volumetric compression ratio $R_{vc}$, c) mixing fuel with the compressed air to obtain an air/fuel mixture, d) combusting the air/fuel mixture, e) extracting energy from the combusted air/fuel mixture through expansion in the topping device, and f) further extracting energy from the combusted air/fuel mixture using a turbine section of the gas turbine, wherein the relationship between $PR_{gt}$ and $R_{vc}$ is maintained such that $PR_{gt} \times R_{vc}^{1.3} < 30$.

In accordance with a still further general aspect of the present invention, there is provided a method of providing a cycle for a compound cycle engine, the engine including a rotary engine and a gas turbine connected in series, the method comprising the steps of: a) determining an auto-ignition limit of a fuel/air mixture; b) determining a pressure ratio associated with the auto-ignition limit; c) determining respective pressure ratios for a compressor section of the gas turbine and for the rotary engine; d) and selecting a combination of pressure ratios for the compressor section and the rotary engines, which provides an overall pressure ratio inferior to the pressure ratio determined in step b).

It is understood that the term "cycle topping device", as used throughout this application and the attached claims, applies to any device adapted to provide an input to the turbine cycle, and not just rotary cycle topping devices such as a Wankel engine, sliding or pinned vane rotary machine (such as those disclosed in U.S. Pat. Nos. 5,524,587 or 5,522,356, respectively). Also, the term "compound cycle engine"

as used throughout this application and the attached claims is intended to refer to an engine wherein at least two different types of engine (e.g. rotary engine and gas turbine, etc.) are integrated together to provide a common output. Further, the term "rotary engine", as is used in the art and as is used herein, is used to refer to an engine in which gas compression and expansion occur in a rotary direction, rather than in a reciprocating manner such as in a piston-style internal combustion engine.

BRIEF DESCRIPTION OF THE DRAWINGS

Reference is now made to the accompanying Figures depicting aspects of the present invention, in which.

DETAILED DESCRIPTION OF THE PREFERRED EMBODIMENTS

Figures 1, 2:
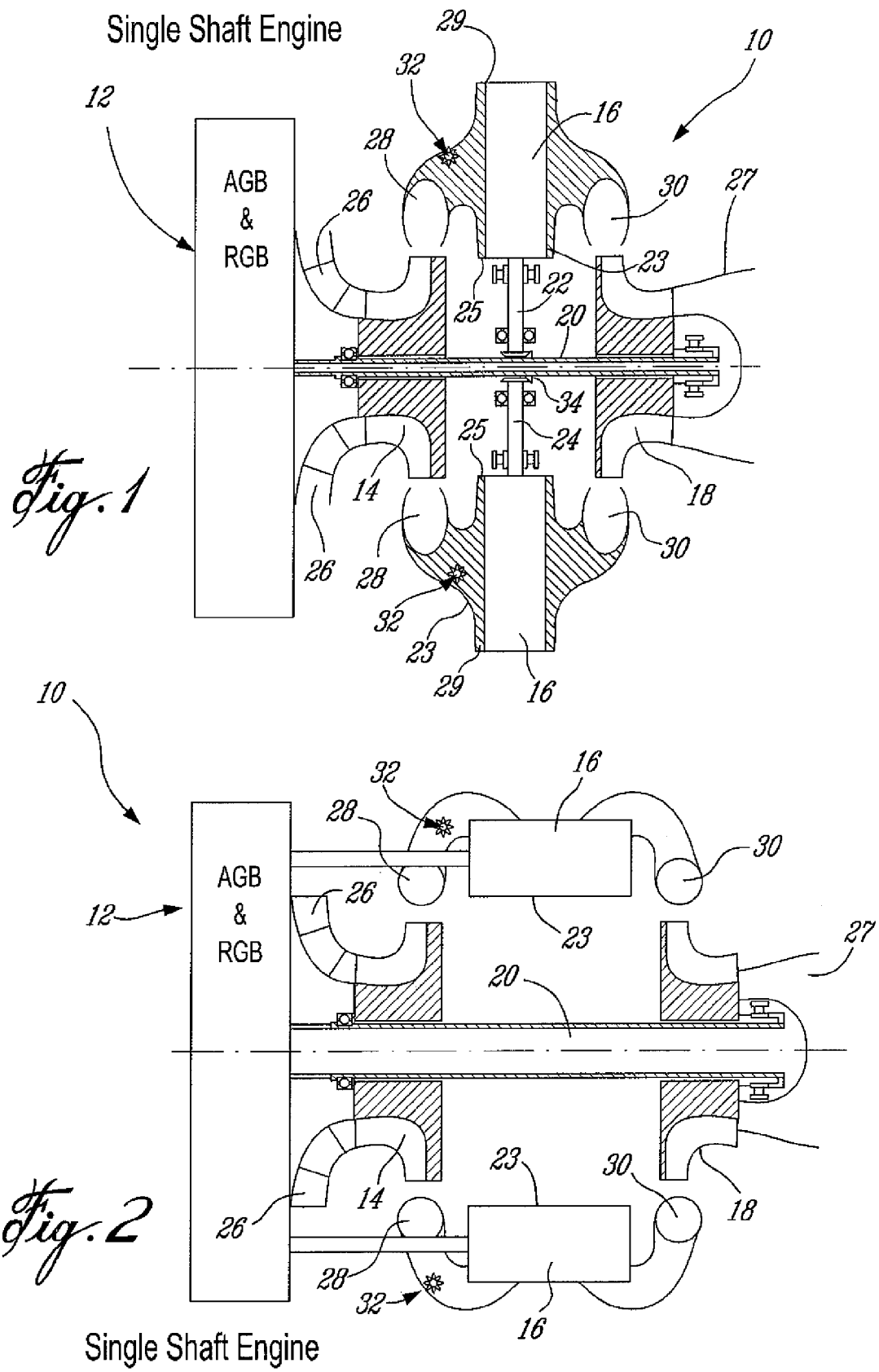
FIG. 1-3 are schematic diagrams of single shaft embodiments of an integrated engine comprising a gas turbine engine turbo-compounded by a rotary cycle topping device.
Figure 3:
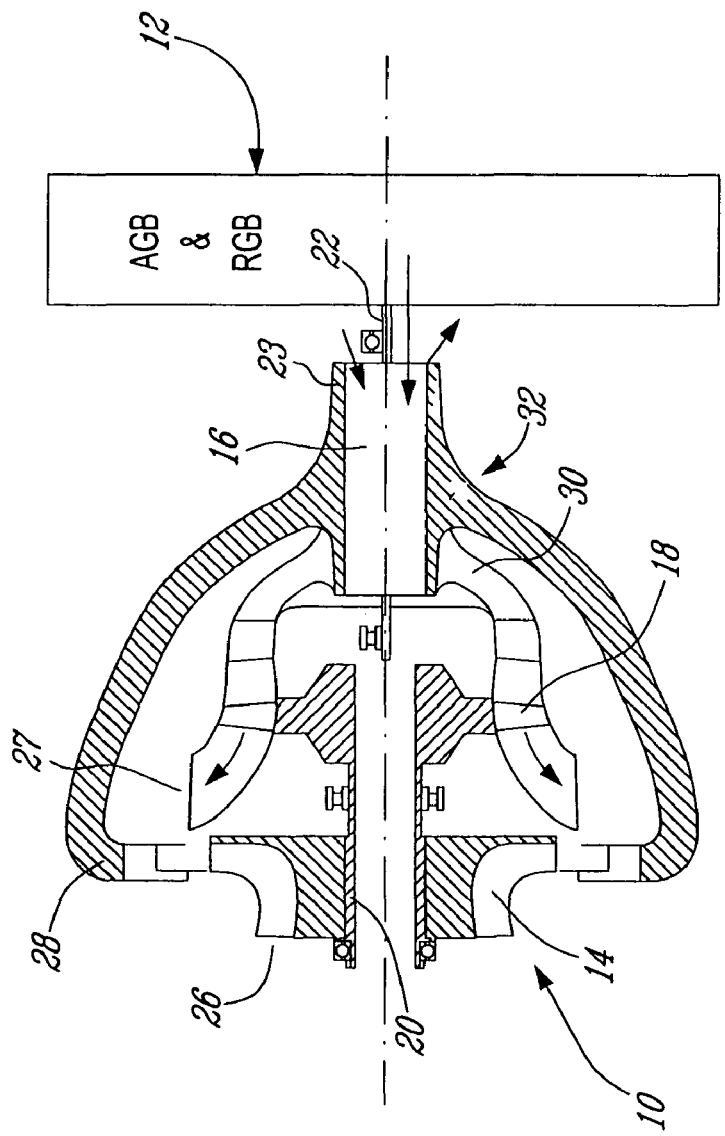

Integrated engine embodiments are shown in FIGS. 1-3 for single shaft concepts where one (1) or two (2) closed volume combustion rotary engines can be coupled to a power turbine via a gearbox. FIG. 1 shows an integrated engine or compound cycle engine wherein the rotary engines are mounted at 90 degrees to the main engine axis. FIG. 2 shows another possible configuration wherein the rotary engines are mounted parallel to the main engine axis. FIG. 3 shows a rotary engine mounted in-line with the main engine axis.

Referring now more particularly to FIG. 1, there is disclosed a single shaft engine 10 which includes an AGB/RGB 12 (accessory gearbox/reduction gearbox), a compressor 14, two rotary machines or engines 16 and a power turbine 18 connected on a single shaft 20. The turbine shown is a radial turbine, though other configurations are possible. The rotary engines 16 are connected to the shaft 20 by separate tower shafts 22 and 24. The compressor 14 is preferably a centrifugal compressor, though need not necessarily be so, and is fed by an intake 26. The compressor 14 communicates with the rotary engines 16 via an inlet scroll 28, and the rotary engines 16 in turn communicates with the power turbine 18 via an outlet scroll 30, to thereby provide a continuous gas path between compressor intake 26 and turbine exhaust 27, as will be understood by the skilled reader. The compressor 14 acts as a turbocharger to the rotary engines 16. A fuel pre-mixer 32 is integrated to the inlet scroll 28 of each rotary engine.

As shown in FIG. 1, the shaft 20 is conjointly driven by the power turbine 18 and the rotary engines 16. The rotary engine output shafts 22 and 24 can be mechanically linked to the shaft 20 by means of bevel gearing 34.

Each rotary engine 16 includes a housing 23 which is liquid-cooled in a suitable manner, and having an associated cooling inlet 25 and outlet 29. The cooling liquid, for instance oil, is circulated through the rotary engine housing 23. As the liquid travels through or over the housing 23, it picks up excess heat. The liquid is then pumped to a liquid cooler (not shown) where the liquid is cooled before being re-circulated back into the rotary engines 16.

As can be readily appreciated from FIG. 1, in use ambient air entering the gas turbine intake 26 is compressed by the compressor 14, then it is routed to the pre-mixer(s) 32 where fuel is premixed with the air. The fuel/air mixture then enters the rotary engines 16, gets further compressed with volume reduction. The compressed mixture is then ignited in the rotary engines, according to known techniques, before being expanded, the energy of such expansion further driving the rotary engine. The rotary engine exhaust gases are then ducted to the power turbine 18 for powering the turbine to produce further work before exhausting to the atmosphere via the turbine exhaust 27.

The power developed by the rotary engines 16 and the power turbine 18 is used to drive a common load via the AGB/RGB 12. As will be appreciated by the skilled reader, and is shown in with respect to the embodiment of FIG. 7, the load can take the form of a propeller, a helicopter rotor, load compressor or an electric generator depending whether the engine is a turboprop, a turboshaft or an APU (Auxiliary Power Unit).

FIGS. 2 and 3 respectively show other embodiments of a single shaft engine wherein like components are identified by like reference numerals. A duplicate description of these components is herein omitted for brevity, as the skilled reader does not require such to understand the concepts disclosed.

The embodiment shown in FIG. 2 essentially differs from the embodiment shown in FIG. 1 in that the rotary engines 16 are mounted parallel to the main engine axis. The output shafts 22 and 24 of the rotary engines 16 are mechanically linked to the power turbine shaft 20 through the AGB/RGB 12.

As can be clearly seen in FIG. 3, the single shaft engine 10 can also be configured so that a single rotary engine 16 is mounted in-line with the power turbine shaft 20. According to this reverse-flow configuration, the turbine shaft 20 is drivingly connected to the AGB/RGB 12 through the rotary engine output shaft 20. Gearing (not shown) is provided to mechanically connect the power turbine shaft 20 to the rotary engine output shaft 22.

As can be seen from FIGS. 1-3, the rotary engine(s) can be mounted such that their shaft axes are either parallel or perpendicular to the gas turbine shaft axis.

Figure 7:
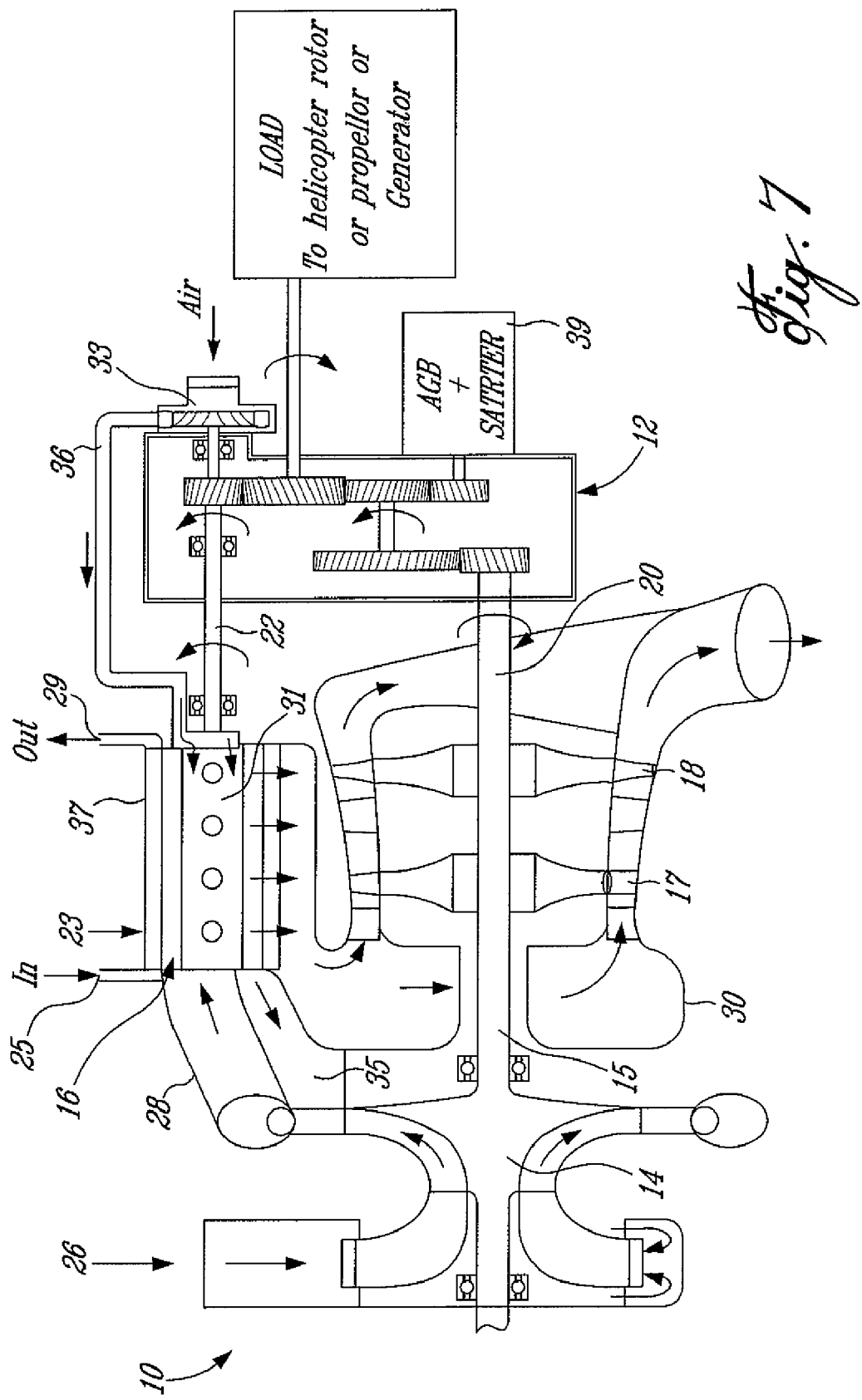
FIG. 7 is a schematic diagram of a free turbine embodiment of an integrated engine.

FIG. 7 shows a free turbine embodiment where the rotary engine 16 (which can be either one or two rotary, or more, rotary engines, but referred to here in the singular for convenience) is coupled to the power turbine 18 only. The compressor 14 is mounted on a separate shaft 15 and is independently driven by a compressor turbine 17 coaxially mounted on the shaft 15. The compressor 14 and the compressor turbine 17 act as a turbocharger to the rotary engine 16. The outputs of the rotary engine 16 and power turbine 18 are linked mechanically through the AGB/RGB 12 to drive a common load (for instance a helicopter rotor, a propeller or a generator). The AGB/RGB provides the required speed reduction (if any, as desired) to permit coupling of the high speed power turbine 18 to the slower rotary engine 16. The power turbine 18 and the rotary engine 16 both cooperate to provide the shaft horsepower required to drive the load coupled to the AGB/RGB 12. This free turbine configuration is advantageous in that it provides the ability to have a high speed turbomachine section (more compact and efficient) since it is not directly mechanically coupled to the slower rotary engine. A smaller starter 39 can also be used on the free turbine configuration as the starter 39 can be provided on the output RGB (see FIG. 7) rather than having to drive the entire compound machine.

A cooling fan 33 is preferably drivingly connected to the rotary engine output shaft 22 to push cooling air through via appropriate ducting 36 to provide cooling air to the air cooled rotor 31 of the rotary engine. The cooling air is then expelled from the rotor to cool the cavity 35 between the compressor 14 and the hot scroll 30. The machine housing 23 is cooled with suitable cooling liquid circulated through a suitable liquid conduit or housing jacket 37, extending between the cooling inlet and outlet 25 and 27, to thereby also extract excess heat from the housing of rotary engine 16.

As is apparent from FIGS. 1-3 and 7, the disclosed embodiments do not include an intercooler between the gas turbine compressor and the rotary engines. The prior art required an intercooler (see for example, U.S. Pat. Nos. 4,815,282 and 5,471,834) to cool the air before it enters the rotary machine in order to prevent pre-ignition of the fuel/air mixture, as the skilled reader will recognize that as a fuel/air mixture is increasingly compressed, in becomes susceptible to igniting. The embodiments of FIGS. 1-3 and 7 were not possible in the prior art, but are now possible through use of the cycle improvements according to another aspect of the present invention, as will now be described.

Figure 4:
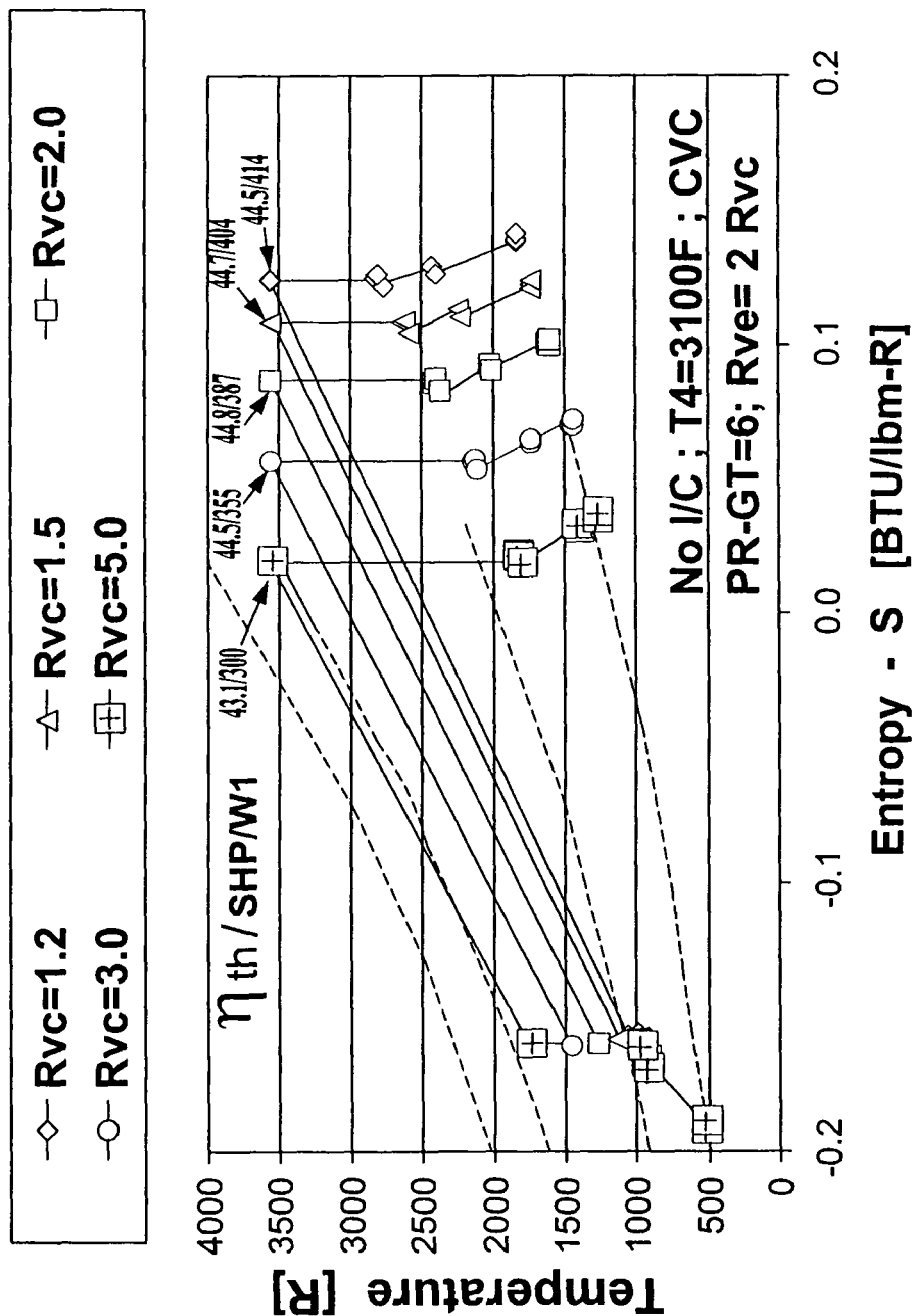
FIG. 4 is a Temperature-Entropy diagram of a turbo-compounded rotary engine cycle.
Figure 5:
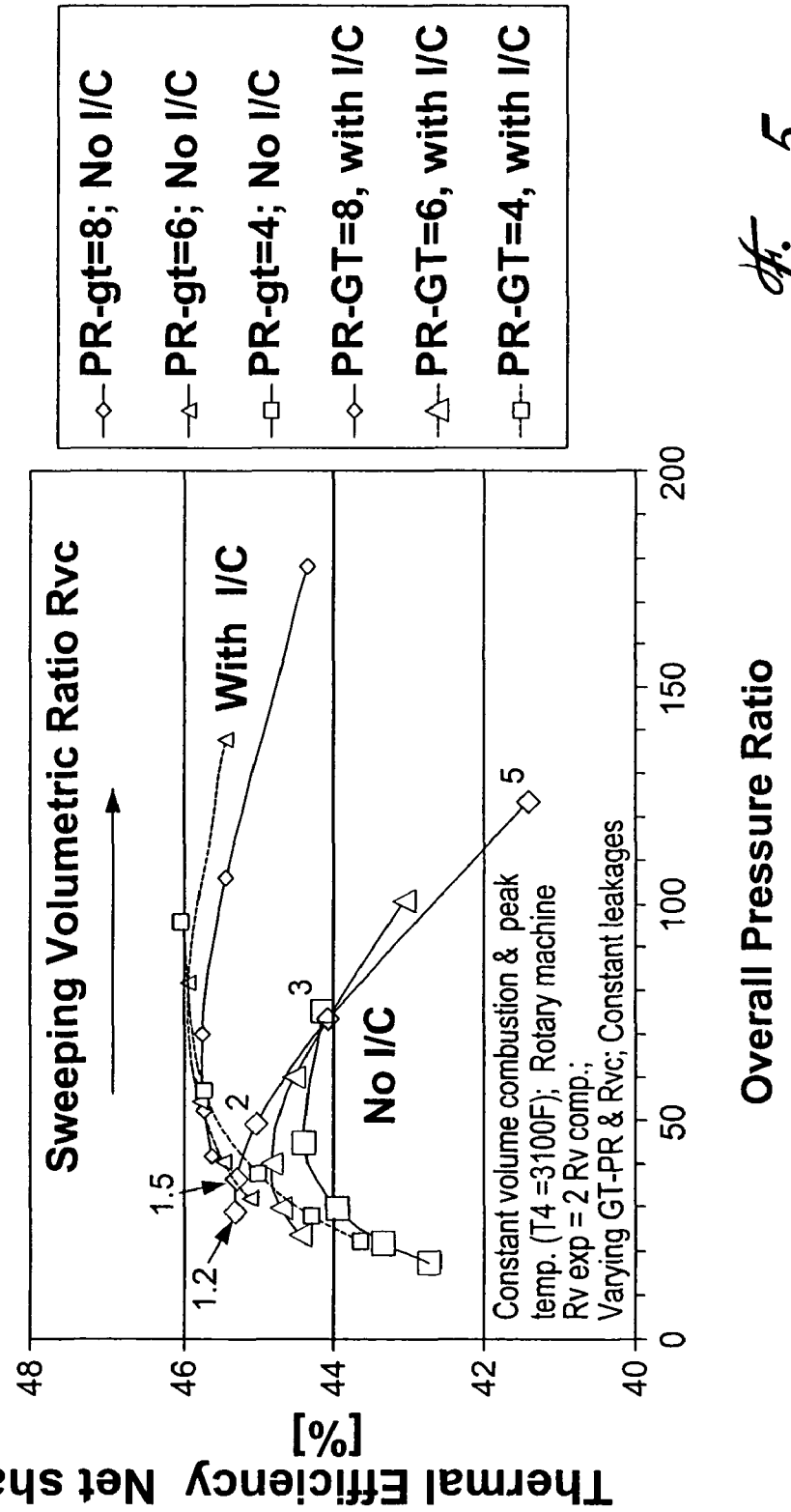
FIG. 5 is a Thermal Efficiency-Overall Pressure Ratio diagram illustrating the sensitivity of an intercooler thermal efficiency vs. the rotary engine volumetric ratio and the gas turbine pressure ratio.

FIGS. 4 and 5 illustrate the high efficiency and specific power of the non-intercooled cycle. The results shown in FIG. 4 are for a constant volume combustion (CVC) rotary engine having a volumetric expansion pressure ratio (Rve) twice its volumetric compression ratio ($R_{vc}$), with no intercooler and a temperature $T_4$ at the exit of the rotary engines 16 set at 3100° F., the rotary engine being used with a gas turbine engine having a compressor pressure ratio (PR-GT) of 6. The temperature-entropy relations were obtained for five different values of volumetric compression ratio ($R_{vc}$=1.2, $R_{vc}$=1.5, $R_{vc}$=2.0, $R_{vc}$=3.0, and $R_{vc}$=5). FIG. 4 also shows the value of the ratio ηth/SHP/W1 (ηth: thermal efficiency; SHP: shaft horse power; W1: airflow at the compressor intake) at the peak temperature of each curve.

The results in FIG. 5 are also for a constant volume combustion rotary engine with a peak temperature $T_4$ of 3100° F., the rotary engine having a volumetric expansion pressure ratio (Rve) twice its volumetric compression ratio ($R_{vc}$), and wherein the compressor pressure ratio (PR-GT) and the volumetric compression ratio ($R_{vc}$) are varied for constant leakages. The term "Net Shaft" in the axis "Thermal efficiency Net Shaft" is intended to mean directly on the output shaft of the engine. FIG. 5 shows three (3) curves for different values of compressor pressure ratio (PR-GT=8; PR-GT=6; and PR-GT=4) when no intercooler is used and three (3) additional curves for the same three different values of compressor pressure ratio (PR-GT=8; PR-GT=6; and PR-GT=4) but this time when an intercooler is used. On each curve, five different values of the volumetric compression ratio of the rotary engine ($R_{vc}$=1.2; $R_{vc}$=1.5; $R_{vc}$=2; $R_{vc}$=3; and $R_{vc}$=5) are provided.

More particularly, the inventor has found that, and FIG. 5 clearly demonstrates that, when no intercooler is used, the thermal efficiency is optimal when the overall pressure ratio of the engine is about 40. When the overall pressure ratio increases over 50, the thermal efficiency drops. From FIG. 5, it can thus be readily seen that under specific conditions (i.e. when the overall pressure ratio is below 50), the intercooler provides very little advantage to thermal efficiency which is more offset by its weight, size and cost. It can also be seen that after a certain point, the thermal efficiency starts to decrease as the volumetric compression ratio ($R_{vc}$) of the rotary engines 16 increases. Considering the much-additional weight and size that an intercooler entails, according to the present invention preferably, $R_{vc}$ is kept below 3.5 to provide optimal thermal efficiency without the need of an intercooler. FIG. 5 also clearly shows that the thermal efficiency of an integrated engine with no intercooler and having an $R_{vc}$ of 3 with a compressor pressure ratio ($PR_{gt}$) of 6 is almost as good as the thermal efficiency of an integrated engine with an intercooler. However, if the compressor is designed with a $PR_{gt}$ of 8, the $R_{vc}$, must be reduced to 1.2 to provide a thermal efficiency equivalent to an integrated engine with an intercooler.

Figure 6:
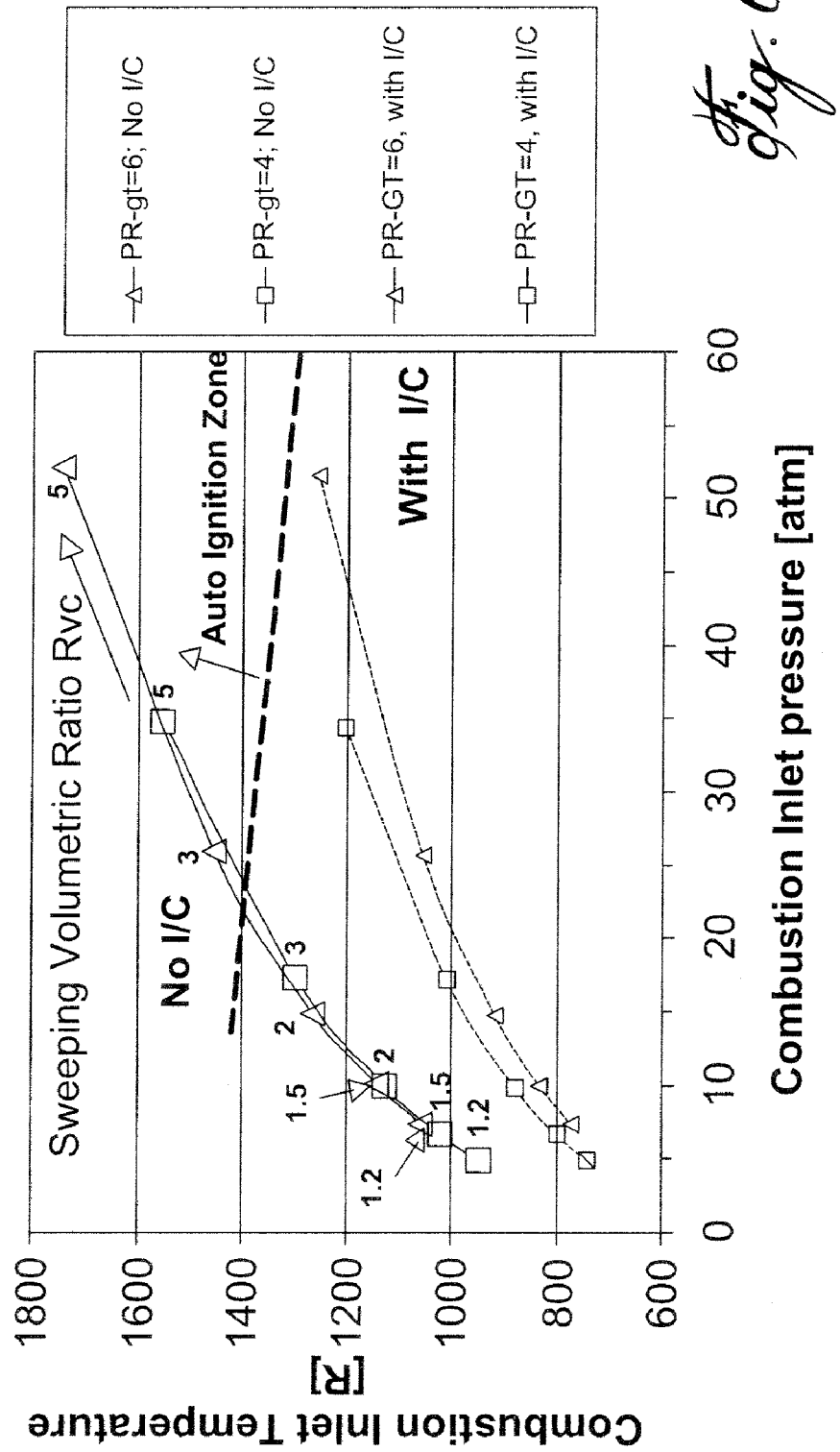
FIG. 6 is a Combustion Inlet Temperature vs. Combustion Inlet Pressure diagram illustrating the sensitivity to auto-ignition vs. rotary engine volumetric ratio and gas turbine pressure ratio.

FIG. 6 shows four curves for two different values of the compressor pressure ratio (PR-gt=6 and PR-gt=4), the first pair of curves, which extends into the auto ignition zone, on the graph being for an engine with no intercooler and the two remaining curves at the bottom of the graph being for an engine with an intercooler. On each curve, five different values of the volumetric compression ratio of the rotary engine ($R_{vc}$=1.2; $R_{vc}$=1.5; $R_{vc}$=2; $R_{vc}$=3; and $R_{vc}$=5) are provided.

As can be clearly seen in FIG. 6, in accordance with the present invention, a limit line (shown with a thick stippled line in the Figure) between an "Auto-Ignition Zone" and a normal zone can be determined, based on the properties of the fuel and fuel/air mixture used. As demonstrated by FIG. 6, a careful selection of overall pressure ratio, and a careful allocation of pressure ratios between the gas turbine and the rotary engines, can be used to achieve an "auto-ignition-free" cycle. If no intercooler is being used, the volumetric compression ratio ($R_{vc}$) in the rotary engines has to be kept below approximately 3 for a compressor pressure ratio ($PR_{gt}$) of 6 and below approximately 3.5 for a $PR_{gt}$ of 4 in order to be out of the auto-ignition zone. The analysis of FIG. 6, clearly show that by reducing the compression ratio, the air heats up less and is then further away from auto-ignition temperature, thereby obviating the need for an intercooler.

In view of the foregoing, it appears that a clear advantage of limiting the volumetric compression ratio in the rotary engine below 3.5 is that while the high thermal efficiency is maintained, the reduced pressure and temperature prior to combustion allows to pre-mix the fuel with air prior to the rotary engines 16 to be done without auto-ignition and no need of an intercooler which is too bulky for many aerospace applications, and particularly so for commercial and commuter aircraft. As will be appreciated by the skilled reader, these cycle limitations are also applicable, and provide similar advantages, to a fuel injected configuration with spark ignition.

The low overall pressure ratio, i.e. preferably less than 50, with low rotary engine compression volumetric ratio, i.e. preferably less than 3.5, and gas turbine pressure ratio, i.e. preferably less than 6, gives a compact optimum thermal efficiency cycle, easier to design with lower loads, less stress and with reduced leakage in seals and gaps. This cycle is particularly attractive to rotary machines designed with controlled rotating gaps as opposed to high speed seals which are subject to wear.

It is noted that the rotary engine compression is described herein as a "volumetric compression ratio" because it is readily measurable in such closed volume combustion engines by reason of its closed volume combustion design, whereas the gas turbine compression described as a "pressure ratio" because of the gas turbine's continuous flow design, in which pressures are more easily measured instead of volume ratios.

The criteria to have a non-intercooled cycle with high thermal efficiency (40-45%) in a compact engine package with improved power to weight ratio can be defined as follows:

$$PR_{gt} \times R_{vc}^{1.3} < 30$$

where $PR_{gt}$ is the pressure ratio of the compressor(s) or gas turbine engine compression stage(s) feeding the rotary engine, and $R_{vc}$ is the volumetric compression ratio of the rotary engine.

Typical values for optimum cycle efficiency are: PRgt=3-6 and Rvc=2-3.5, and full range of interest to meet above criteria 1.2<PRgt<9 and 1.2<Rvc<12

As long as the above conditions are met, it will be possible to operate without an intercooler to cool the air before it enters the rotary engines 16. This advantageously provides for a very compact integrated engine package. Furthermore, limiting the overall pressure ratio below 50 also contributes to reduce the weight in that otherwise the wall thickness of the rotary engines would have to be thicker and heavier.

The above-described combination of compression ratio in the rotary engines and the gas turbine engine ensures that the temperature of the pre-mixed air/fuel mixture just prior to the combustion is below 1100° F. It is noted that the above "pressure rules" applies to diesel or kerosene/jet engines type of fuel.

The above description is meant to be exemplary only, and one skilled in the art will recognize that changes may be made to the embodiments described without departing from the scope of the invention disclosed. For example, it is understood that the rotary engine could be replaced by several rotary engines in parallel or series, or by other types of turbine cycle topping devices. For instance, a reciprocating engine could be used as well as a wave engine coupled to a combustor. Rotary engines are however preferred for compactness and speed compatibility (rotary engines have higher rotational speed potential vs. reciprocating engines). Another example is that instead of using pre-mix air/fuel upstream of the topping device, other configurations with fuel injection directly into the topping device after air compression, to be ignited with spark ignition, may also be employed. The terms "accessory gearbox" and "reduction gearbox" are used herein as those are familiar terms of gas turbine art, however the skilled reader will appreciate that the gearbox provided may be any suitable transmission system, and may or may not include speed reduction, depending on the application. Though one compression and one turbine stage is shown, any suitable number of stages may be provided as desired. Still other modifications which fall within the scope of the present invention will be apparent to those skilled in the art, in light of a review of this disclosure, and such modifications are intended to fall within the equivalents accorded to the appended claims.

The invention claimed is:

1. A method of providing a non-intercooled cycle for a compound cycle engine, the engine having a rotary engine and a gas turbine connected in series, the method comprising the steps of:
    a) compressing air in a compressor section of the gas turbine,
    b) pre-mixing fuel with the compressed air to obtain an air/fuel mixture,
    c) injecting the pre-mixed air/fuel mixture into the rotary engine, wherein a volumetric compression ratio $R_{vc}$ in the rotary engine is below 3.5,
    d) combusting the air/fuel mixture,
    e) extracting energy from the combusted air/fuel mixture through expansion in the rotary engine, and
    f) further extracting energy from the combusted air/fuel mixture using a turbine section of the compound cycle engine, wherein the compressor section compresses the air according to a pressure ratio $PR_{gt}$, and wherein the pressure distribution between the rotary engine and the compressor section is defined by the following relation: $PR_{gt} \times R_{vc}^{1.3} < 30$.

2. A method as defined in claim 1, wherein step a) employs a compression ratio below 6.

3. A method as defined in claim 1, wherein the combined pressure ratio of steps a) and b) is below 50.

4. A method of providing a non-intercooled cycle for a compound cycle engine, the engine including a cycle topping device and a gas turbine connected in series, the method comprising the steps of:
    a) compressing air in a compressor section of the gas turbine using a pressure ratio $PR_{gt}$,
    b) further compressing the air in the cycle topping device using a volumetric compression ratio $R_{vc} \leq 3.5$,
    c) mixing fuel with the compressed air to obtain an air/fuel mixture,
    d) combusting the air/fuel mixture,
    e) extracting energy from the combusted air/fuel mixture through expansion in the topping device, and
    f) further extracting energy from the combusted air/fuel mixture using a turbine section of the gas turbine, wherein the relationship between $PR_{gt}$ and $R_{vc}$ is maintained such that a compression split between the compressor section of the gas turbine and the cycle topping device is defined by the following relation: $PR_{gt} \times R_{vc}^{1.3} < 30$.

5. A method as defined in claim 4, wherein $R_{vc}$ is between 2 and 3.5.

6. A method as defined in claim 4, wherein $PR_{gt}$ is between 1.2 and 9.

7. A method as defined in claim 6, wherein $PR_{gt}$ is between 3 and 6.

8. A method of providing a cycle for a compound cycle engine, the engine including a rotary engine and a gas turbine connected in series, the method comprising the steps of:
    a) determining an auto-ignition limit of a fuel/air mixture;
    b) determining a pressure ratio associated with the auto-ignition limit;
    c) determining respective pressure ratios for a compressor section of the gas turbine and for the rotary engine;
    d) and selecting a combination of pressure ratios for the compressor section and the rotary engines, which provides an overall pressure ratio inferior to the pressure ratio determined in step b), wherein the pressure ratio in the compressor section is $PR_{gt}$, wherein the pressure ratio of the rotary engine is measured in the form of a volumetric compression ratio $R_{vc}$, wherein the relationship between $PR_{gt}$ and $R_{vc}$ is maintained such that the level of compression accomplished by the compressor section and the rotary engine respect the following proportions: $PR_{gt} \times R_{vc}^{1.3} < 30$, and wherein $R_{vc} \leq 3.5$.

9. A method as defined in claim 8, wherein $R_{vc}$ is between 1.2 and 3.5.

10. A method as defined in claim 9, wherein $R_{vc}$ is between 2 and 3.5.

11. A method as defined in claim 8, wherein $PR_{gt}$ is between 1.2 and 9.

12. A method as defined in claim 11, wherein $PR_{gt}$ is between 3 and 6.

13. A compound cycle engine comprising a compressor section, a rotary engine section receiving compressed air from the compressor section, and a turbine section receiving exhaust gases directly from the rotary engine section, and a primary output shaft providing the primary power output of the engine, wherein the rotary engine section and the turbine section are both drivingly connected to the primary output shaft, wherein the rotary engine section maintains a rotary engine volumetric compression ratio $R_{vc}$ below 3.5, the compressor section compressing the air according to a pressure ratio $PR_{gt}$, and wherein the pressure distribution between the compressor section and the rotary engine section is defined by the following relation: $PR_{gt} \times R_{vc}^{1.3} < 30$.

14. A compound cycle engine as defined in claim 13, wherein said primary output shaft is drivingly connected to a load selected from a group consisting of: a helicopter rotor, a propeller, and a generator.

15. A compound cycle engine as defined in claim 13, wherein the rotary engine section is mechanically linked to the turbine section via a gas turbine engine reduction gearbox (RGB).

16. A compound cycle engine as defined in claim 13, wherein said rotary engine section includes at least two rotary engines.

17. A compound cycle engine as defined in claim 16, wherein said rotary engines are mounted in one of a parallel, perpendicular and in-line relationship to the turbine section.

18. A compound cycle engine as defined in claim 13, wherein said turbine section includes a free turbine comprising a power turbine mechanically linked to the rotary engine section via a gas turbine engine reduction gearbox.

19. A compound cycle engine as defined in claim 13, wherein the compressor section provides a pressure ratio of less than 9.

20. A compound cycle engine as defined in claim 19, wherein the compound cycle engine provides an overall pressure ratio of less than 50.

21. A compound cycle engine as defined in claim 13, wherein a fuel pre-mixer is provided upstream of the rotary engine section.

22. A compound cycle engine as defined in claim 21, wherein the air compressed by the compressor section is directly ducted into said rotary engine section by means of an inlet scroll to which said fuel pre-mixer is integrated.

23. A compound cycle engine comprising a compressor section and a turbine section, and at least one cycle topping device providing an energy input to said turbine section, the at least one cycle topping device receiving compressed air from the compressor section, said turbine section receiving exhaust gases directly from said at least one cycle topping device, the at least one cycle topping device and the turbine section driving a common load, said compressor section compressing the air according to a pressure ratio $PR_{gt}$, said at least one cycle topping device further compressing the air according to a volumetric compression ratio $R_{vc} \leq 3.5$, and wherein the distribution of the compression between the compressor section and the at least one cycle topping device is defined by the following relation:
$PR_{gt} \times R_{vc}^{1.3} < 30$.

24. A compound cycle engine as defined in claim 23, wherein $R_{vc}$ is between 1.2 and 3.5.

25. A compound cycle engine as defined in claim 24, wherein $R_{vc}$ is between 2 and 3.5.

26. A compound cycle engine as defined in claim 23, wherein $PR_{gt}$ is between 3 and 6.

27. A compound cycle engine comprising a gas turbine engine having a compressor section and a turbine section, and at least one rotary engine receiving compressed air from said compressor section and providing an energy input to said turbine section, said turbine section receiving engine exhaust gases directly from said at least one rotary engine, wherein said at least one rotary engine is mechanically linked to said turbine section to provide a common power output, wherein said at least one rotary engine is turbocharged by said compressor section, the compressor section compressing the air according to a pressure ratio $PR_{gt}$, the at least one rotary engine further compressing the air according to a volumetric compression ratio $R_{vc}$, and wherein the pressure distribution between the compressor section of the gas turbine engine and the at least one rotary engine is defined by the following relation: $PR_{gt} \times R_{vc}^{1.3} < 30$, and wherein $R_{vc} < 3.5$.

28. A compound cycle engine as defined in claim 27, wherein said at least one rotary engine is coupled to said turbine section via a gas turbine engine reduction gearbox (RGB).

29. A compound cycle engine as defined in claim 27, wherein the compressor section provides a pressure ratio of less than 9.

30. A compound cycle engine as defined in claim 27, wherein the compound cycle engine provides an overall pressure ratio of less than 50.

31. A compound cycle engine as defined in claim 27, wherein a fuel pre-mixer is provided upstream of the rotary engine.

32. A compound cycle engine as defined in claim 31, wherein the air compressed by the compressor section is directly ducted into said at least one rotary engine by means of an inlet scroll to which said fuel pre-mixer is integrated.

33. A compound cycle engine as defined in claim 27, wherein said turbine section includes a free power turbine, and wherein reduction gearing is provided for drivingly connecting the free power turbine and said at least one rotary engine together to drive a common load.

34. A compound cycle engine as defined in claim 33, wherein said load is selected from a group consisting of: a helicopter rotor, a propeller and a generator.

* * * * *